(12) United States Patent
Parihar et al.

(10) Patent No.: US 10,511,031 B2
(45) Date of Patent: Dec. 17, 2019

(54) CORROSION RESISTANT BARRIER LAYER FOR A SOLID OXIDE FUEL CELL STACK AND METHOD OF MAKING THEREOF

(71) Applicant: BLOOM ENERGY CORPORATION, Sunnyvale, CA (US)

(72) Inventors: Shailendra Parihar, Santa Clara, CA (US); Emad El Batawi, Sunnyvale, CA (US); Anita Pradeep Hothur, San Jose, CA (US)

(73) Assignee: BLOOM ENERGY CORPORATION, San Jose, CA (US)

( * ) Notice: Subject to any disclaimer, the term of this patent is extended or adjusted under 35 U.S.C. 154(b) by 63 days.

(21) Appl. No.: 15/796,105

(22) Filed: Oct. 27, 2017

(65) Prior Publication Data

US 2018/0047999 A1 Feb. 15, 2018

Related U.S. Application Data

(60) Continuation of application No. 15/409,964, filed on Jan. 19, 2017, now Pat. No. 9,853,298, which is a division of application No. 14/265,544, filed on Apr. 30, 2014, now Pat. No. 9,583,771.

(60) Provisional application No. 61/824,025, filed on May 16, 2013.

(51) Int. Cl.
| | |
|---|---|
| H01M 8/0228 | (2016.01) |
| H01M 8/2425 | (2016.01) |
| H01M 8/2483 | (2016.01) |
| H01M 8/2484 | (2016.01) |
| H01M 8/0271 | (2016.01) |
| H01M 8/2465 | (2016.01) |
| H01M 8/0215 | (2016.01) |
| H01M 8/124 | (2016.01) |

(52) U.S. Cl.
CPC ....... *H01M 8/0228* (2013.01); *H01M 8/0215* (2013.01); *H01M 8/0271* (2013.01); *H01M 8/2425* (2013.01); *H01M 8/2465* (2013.01); *H01M 8/2483* (2016.02); *H01M 8/2484* (2016.02); *H01M 2008/1293* (2013.01); *Y02P 70/56* (2015.11)

(58) Field of Classification Search
CPC ....... H01M 2008/1293; H01M 8/0215; H01M 8/0228; H01M 8/2425; Y02P 70/56
See application file for complete search history.

(56) References Cited

U.S. PATENT DOCUMENTS

| | | |
|---|---|---|
| 4,135,041 A | 1/1979 | Jung et al. |
| 4,755,429 A | 7/1988 | Nickols et al. |
| 4,913,982 A | 4/1990 | Kotchick et al. |
| 5,162,167 A | 11/1992 | Minh et al. |
| 5,213,910 A | 5/1993 | Yamada |
| 5,215,946 A | 6/1993 | Minh |
| 5,248,712 A | 9/1993 | Takeuchi et al. |
| 5,256,499 A | 10/1993 | Minh et al. |
| 5,273,837 A | 12/1993 | Aiken et al. |
| 5,290,642 A | 3/1994 | Minh et al. |
| 5,342,705 A | 8/1994 | Minh et al. |
| 5,368,667 A | 11/1994 | Minh et al. |
| 5,382,315 A | 1/1995 | Kumar |
| 5,385,792 A | 1/1995 | Shiratori et al. |
| 5,453,331 A | 9/1995 | Bloom et al. |
| 5,494,700 A | 2/1996 | Anderson et al. |
| 5,501,914 A | 3/1996 | Satake et al. |
| 5,518,829 A | 5/1996 | Satake et al. |
| 5,589,017 A | 12/1996 | Minh |
| 5,641,585 A | 6/1997 | Lessing et al. |
| 5,733,499 A | 3/1998 | Takeuchi et al. |
| 5,955,392 A | 9/1999 | Takeuchi et al. |
| 6,001,761 A | 12/1999 | Hata et al. |
| 6,361,892 B1 | 3/2002 | Ruhl et al. |
| 6,492,053 B1 | 12/2002 | Donelson et al. |
| 6,582,845 B2 | 6/2003 | Helfinstine et al. |
| 6,589,681 B1 | 7/2003 | Yamanis |
| 6,638,575 B1 | 10/2003 | Chen et al. |
| 6,835,488 B2 | 12/2004 | Sasahara et al. |
| 7,045,237 B2 | 5/2006 | Sridhar et al. |
| 8,691,470 B2 | 4/2014 | Kumar et al. |
| 9,583,771 B2 | 2/2017 | Parihar et al. |
| 2002/0012825 A1 | 1/2002 | Sasahara et al. |
| 2002/0132156 A1 | 9/2002 | Ruhl et al. |
| 2003/0170527 A1 | 9/2003 | Finn et al. |
| 2003/0180602 A1 | 9/2003 | Finn |
| 2004/0101742 A1 | 5/2004 | Simpkins et al. |
| 2004/0200187 A1 | 10/2004 | Warrier et al. |
| 2005/0017055 A1 | 1/2005 | Kurz et al. |
| 2005/0053819 A1 | 3/2005 | Paz |
| 2005/0136312 A1 | 6/2005 | Bourgeois et al. |
| 2005/0227134 A1 | 10/2005 | Nguyen |
| 2007/0037031 A1 | 2/2007 | Cassidy et al. |
| 2007/0134532 A1 | 6/2007 | Jacobson et al. |
| 2007/0231676 A1 | 10/2007 | Cassidy et al. |
| 2008/0081223 A1 | 4/2008 | Yasumoto et al. |
| 2008/0193825 A1 | 8/2008 | Nguyen et al. |
| 2010/0055533 A1 | 3/2010 | Kebbede et al. |
| 2010/0119917 A1 | 5/2010 | Kumar et al. |
| 2010/0129693 A1 | 5/2010 | Nguyen et al. |

(Continued)

*Primary Examiner* — Ladan Mohaddes (74) *Attorney, Agent, or Firm* — The Marbury Law Group PLLC (57) ABSTRACT

A method of forming diffusion barrier layer includes providing an interconnect for a fuel cell stack, forming a glass barrier precursor layer over a Mn and/or Co containing electrically conductive contact layer on the interconnect, and heating the barrier precursor layer to precipitate crystals in the barrier precursor layer to convert the barrier precursor layer to a glass ceramic barrier layer.

5 Claims, 12 Drawing Sheets

(56) References Cited

U.S. PATENT DOCUMENTS

| | | |
|---|---|---|
| 2010/0159344 A1 | 6/2010 | Gottmann et al. |
| 2010/0209802 A1 | 8/2010 | Armstrong et al. |
| 2011/0200909 A1 | 8/2011 | Parihar et al. |
| 2013/0130146 A1 | 5/2013 | Batawi et al. |
| 2014/0342267 A1 | 11/2014 | Parihar et al. |
| 2017/0317360 A1 | 11/2017 | Parihar et al. |

CORROSION RESISTANT BARRIER LAYER FOR A SOLID OXIDE FUEL CELL STACK AND METHOD OF MAKING THEREOF

FIELD

The present invention is generally directed to solid oxide fuel cells (SOFCs) and more specifically to forming coatings that provide corrosion resistance to electrolytes for solid oxide fuel cells.

BACKGROUND

Fuel cells are electrochemical devices which can convert energy stored in fuels to electrical energy with high efficiencies. Electrolyzer cells are electrochemical devices which can use electrical energy to reduce a given material, such as water, to generate a fuel, such as hydrogen. The fuel and electrolyzer cells may comprise reversible cells which operate in both fuel cell and electrolysis mode.

In a high temperature fuel cell system, such as a solid oxide fuel cell (SOFC) system, an oxidizing flow is passed through the cathode side of the fuel cell, while a fuel flow is passed through the anode side of the fuel cell. The oxidizing flow is typically air, while the fuel flow can be a hydrocarbon fuel, such as methane, natural gas, propane, ethanol, or methanol. The fuel cell, operating at a typical temperature between 750° C. and 950° C., enables combination of the oxygen and free hydrogen, leaving surplus electrons behind. The excess electrons are routed back to the cathode side of the fuel cell through an electrical circuit completed between anode and cathode, resulting in an electrical current flow through the circuit.

Fuel cell stacks may be either internally or externally manifolded for fuel and air. In internally manifolded stacks, the fuel and air is distributed to each cell using risers contained within the stack. In other words, the gas flows through openings or holes in the supporting layer of each fuel cell, such as the electrolyte layer, and gas separator of each cell. In externally manifolded stacks, the stack is open on the fuel and air inlet and outlet sides, and the fuel and air are introduced and collected independently of the stack hardware. For example, the inlet and outlet fuel and air flow in separate channels between the stack and the manifold housing in which the stack is located.

Figure 1:
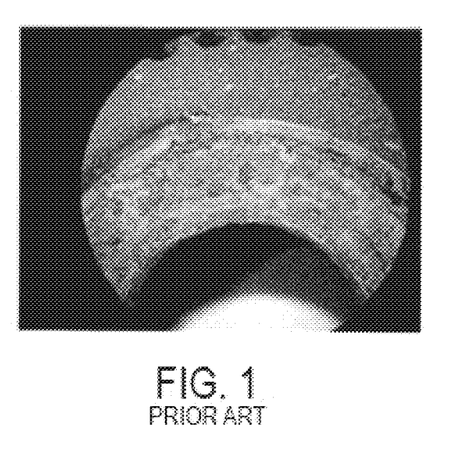
FIGS. 1 and 2 are photographs showing cell electrolyte corrosion and cracking in prior art SOFC stacks.
Figure 2:
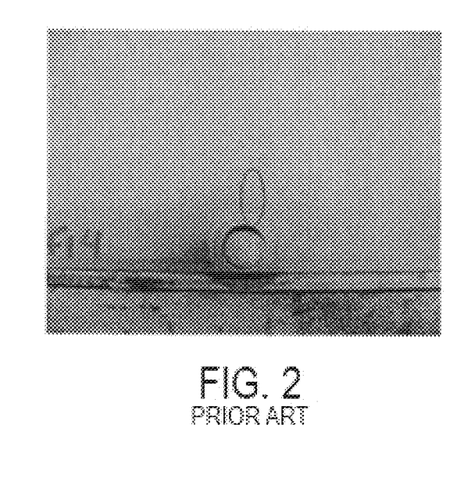

Fuel cell stacks are frequently built from a multiplicity of cells in the form of planar elements, tubes, or other geometries. Fuel cell stacks, particularly those with planar geometry, often use seals between electrolyte and interconnect surfaces to contain fuel and air at various locations within the stack. As shown in FIG. 1, in fuel cell stacks that are internally manifolded for fuel (i.e., in which fuel is provided through fuel riser openings in SOFCs and interconnects in the stack) electrolyte crack formation has been observed at ring seals initiated by cell electrolyte corrosion. A ring seal is a seal that surrounds the fuel inlet and fuel outlet riser openings between the cathode (i.e., air) side of a given SOFC and an air side of an adjacent interconnect (also known as a gas separator plate). This corrosion in conjunction with stresses which occur during operation lead to cracks, cell cracking and catastrophic failure at elevated temperatures (e.g., after 2 hours at 900 C) as shown in FIG. 2.

SUMMARY

An embodiment relates to a method of forming a diffusion barrier layer, comprising providing an interconnect for a fuel cell stack, wherein the interconnect contains an electrically conductive contact layer located on an air surface of the interconnect, and wherein the electrically conductive contact layer contains at least one of Co and Mn, forming a barrier precursor layer comprising at least 90 wt. % glass over the electrically conductive contact layer, and heating the barrier precursor layer to precipitate crystals in the barrier precursor layer to convert the barrier precursor layer to a glass ceramic barrier layer.

Another embodiment relates to a solid oxide fuel cell (SOFC) stack, comprising a plurality of SOFCs and a plurality of interconnects. Each of the plurality of the interconnects is located between two adjacent SOFCs. Each of the plurality of the interconnect comprises an electrically conductive contact layer located on an air surface of the interconnect, the electrically conductive contact layer containing at least one of Co and Mn, and a glass ceramic barrier layer located over the electrically conductive contact layer. The glass ceramic barrier layer comprises zirconium silicate ($ZrSiO_4$) crystals, barium aluminum silicate ($BaAlSiO_4$) crystals and potassium feldspar ($KAlSi_3O_8$) crystals located in a glassy matrix.

Another embodiment relates to an interconnect for a fuel cell stack, comprising an interconnect body having an air surface having air flow channels and ribs and a fuel surface having fuel flow channels and ribs, an electrically conductive contact layer located on the air surface of the interconnect, the electrically conductive contact layer containing at least one of Co and Mn, and a first layer located over the electrically conductive contact layer. The first layer comprises:

45-55 wt. % silica ($SiO_2$);
5-10 wt. % potassium oxide ($K_2O$);
2-5 wt. % calcium oxide (CaO);
2-5 wt. % barium oxide (BaO);
0-1 wt. % boron trioxide ($B_2O_3$);
15-25 wt. % alumina ($Al_2O_3$); and
20-30 wt. % zirconia ($ZrO_2$) on an oxide weight basis.

BRIEF DESCRIPTION OF THE DRAWINGS

FIG. 1 is a close up of the corrosion and FIG. 2 is a top view of a SOFC containing a crack (circled).

DETAILED DESCRIPTION

The present inventors realized that solid oxide fuel cell electrolyte corrosion and cracking may be reduced or eliminated by reducing or eliminating manganese diffusion from a manganese containing, electrically conductive contact layer on the interconnect into the ceramic electrolyte. The inventors have observed that manganese from the manganese containing layer diffuses or leaches into a glass or glass ceramic seal and the manganese (and/or a manganese containing compound, such as a manganese rich silicate) then diffuses into the zirconia based electrolyte and accumulates at the electrolyte grain boundaries, resulting in intergranular corrosion of the electrolyte. The inventors further observed that absent a glass seal, manganese from the contact layer located on the interconnect does not attack the zirconia based electrolyte, such as yttria and/or scandia stabilized zirconia. In fact, the SOFC cathode electrode directly on the electrolyte may comprise LSM without attacking the electrolyte. Thus, in an embodiment in which a stack is internally manifolded for fuel, corrosion of the stabilized zirconia electrolyte can be reduced or prevented by isolating the electrolyte from manganese diffusion from the conductive contact layer by depositing a manganese diffusion barrier between the manganese containing contact layer and the glass seal. In another embodiment, the barrier layer may be deposited between the glass seal and the stabilized zirconia electrolyte. Alternatively, barrier layers may be deposited between both the manganese containing barrier layer and the glass seal and between the glass seal and the stabilized zirconia electrolyte. The barrier layer may be used with any manganese and/or cobalt containing metal oxide contact layer on the interconnect, such as a perovskite layer (e.g., lanthanum strontium manganate ("LSM"), lanthanum strontium cobaltite or lanthanum strontium manganate-cobaltite), a spinel layer (e.g., a manganese cobalt oxide spinel, such as a $Mn_xCo_{3-x}O_4$ spinel ("MCO"), where x ranges between 1 and 2) or a mixture of a perovskite and spinel metal oxide (e.g., a mixed LSM and MCO layer). However, LSM is used as an exemplary metal oxide coating below for brevity.

Figure 3:
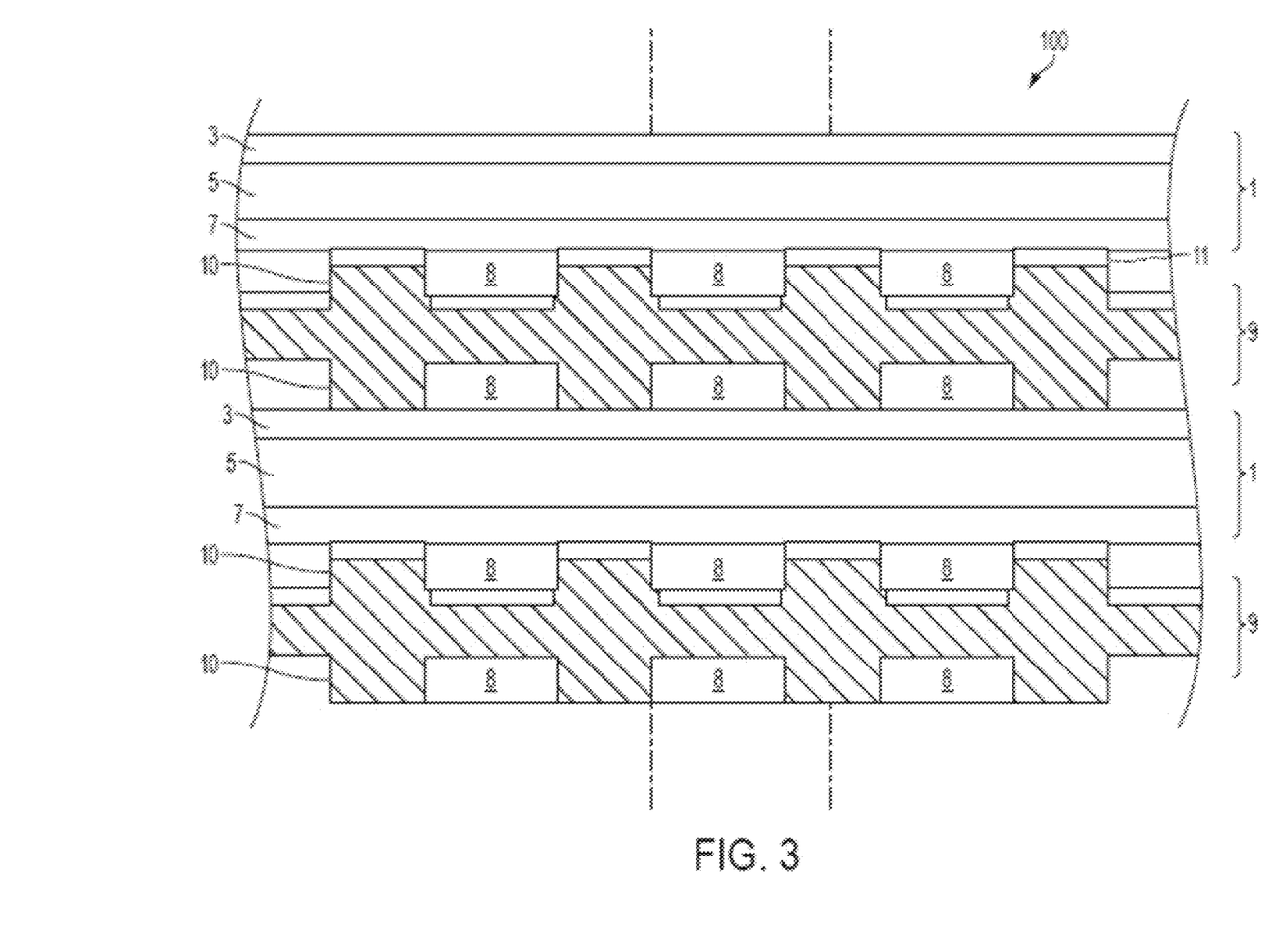
FIG. 3 illustrates a side cross sectional view of a SOFC stack along lines A-A in FIGS. 4A and 5A of an embodiment of the invention.

FIG. 3 illustrates a side cross sectional view through a middle of planar solid oxide fuel cell (SOFC) stack 100. The stack comprises a plurality of solid oxide fuel cells 1 and a plurality of interconnects/gas separator plates 9. Each cell 1 includes an anode electrode 3, a solid oxide electrolyte 5 and a cathode electrode 7. The anode electrode 3 may comprise a cermet having a metal phase, such as a nickel or nickel oxide phase and a ceramic phase, such as a doped ceria (such as samaria or gadolinia doped ceria) and/or a stabilized zirconia, such as yttria or scandia stabilized zirconia. The anode 3 may comprise one or more sublayers comprising the above described cermet or ceramic materials. The electrolyte 5 may comprise a stabilized zirconia, such as scandia stabilized zirconia (SSZ) or yttria stabilized zirconia (YSZ). Alternatively, the electrolyte 5 may comprise another ionically conductive material, such as a doped ceria. The cathode electrode 7 may comprise an electrically conductive material, such as an electrically conductive perovskite material, such as lanthanum strontium manganite (LSM). Other conductive perovskites, such as LSCo, etc., or metals, such as Pt, may also be used.

FIG. 3 shows that the lower SOFC 1 is located between two interconnects 9. Each interconnect/gas flow separator plate 9 separates fuel, such as a hydrogen and/or a hydrocarbon fuel, flowing to the fuel electrode (i.e. anode 3) of one cell in the stack from oxidant, such as air, flowing to the air electrode (i.e. cathode 7) of an adjacent cell in the stack. The interconnect 9 contains gas flow passages or channels 8 between the ribs 10. The interconnect electrically connects the fuel electrode 3 of one cell to the air electrode 7 of the adjacent cell. The interconnect is made of or contains electrically conductive material, such as chromium or an alloy thereof, such as chromium-iron, chromium-yttrium, chromium-iron-yttrium, etc. A first electrically conductive contact layer, such as a metal oxide perovskite and/or spinel layer 11, is provided on the air side of the interconnect 9 (i.e., between the interconnect and the cathode electrode 7 of an adjacent fuel cell 1). Layer 11 coats the tops of the ribs 10, the sides of the ribs 10 (not shown for clarity) and the bottoms of the flow passages 8. An optional second electrically conductive contact layer (not shown), such as a nickel contact layer, may be provided on the fuel side of the interconnect (i.e., between the anode electrode and the interconnect).

While vertically oriented stacks are shown in FIG. 3, the fuel cells may be stacked horizontally or in any other suitable direction between vertical and horizontal. The term "fuel cell stack," as used herein, means a plurality of stacked fuel cells which share a common fuel inlet and exhaust passages or risers. The "fuel cell stack," as used herein, includes a distinct electrical entity which contains two end plates which are connected to power conditioning equipment and the power (i.e., electricity) output of the stack. Thus, in some configurations, the electrical power output from such a distinct electrical entity may be separately controlled from other stacks. The term "fuel cell stack" as used herein, also includes a part of the distinct electrical entity. For example, the stacks may share the same end plates. In this case, the stacks jointly comprise a distinct electrical entity. In this case, the electrical power output from both stacks cannot be separately controlled.

Figure 4A:
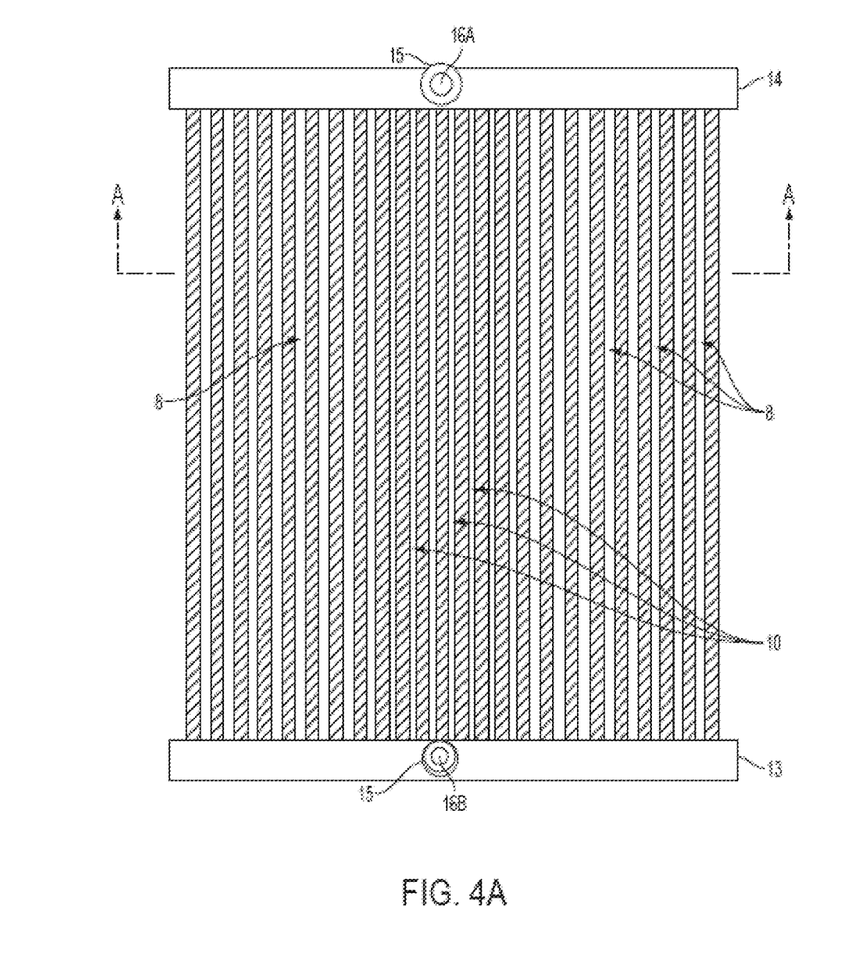
FIGS. 4A and 4B are top views of an air side of an interconnect of an embodiment of the present invention.
Figure 4B:
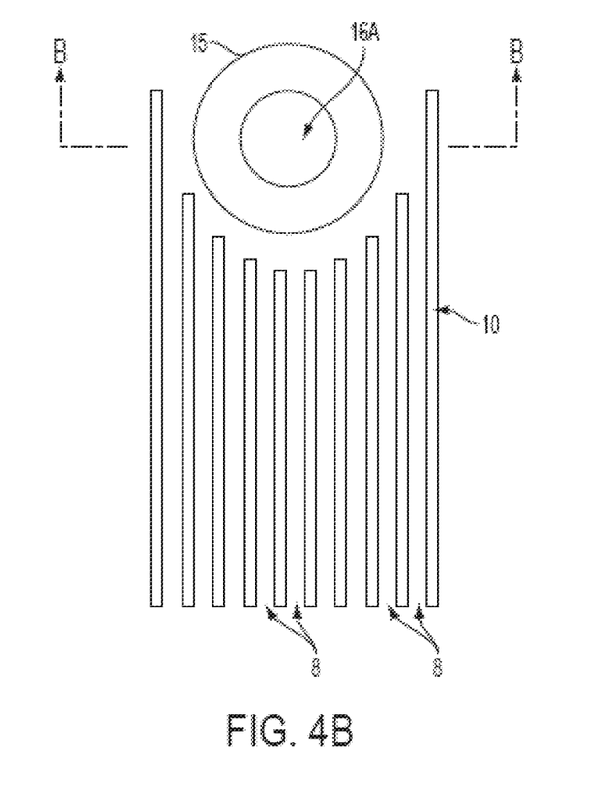

FIG. 4A shows the air side of an exemplary interconnect 9. The interconnect may be used in a stack which is internally manifolded for fuel and externally manifolded for air. The interconnect contains air flow passages or channels 8 between ribs 10 to allow air to flow from one side 13 to the opposite side 14 of the interconnect. Ring seals 15 are located around fuel inlet and outlet openings 16A, 16B (i.e., through holes 16A, 16B which comprise part of the respective fuel inlet and outlet riser openings extending through interconnect 9). Strip seals (not shown) are located on lateral sides of the interconnect 1. FIG. 4B shows a close up view of an exemplary seal 15, passages 8 and ribs 10. The seals 15 may comprise any suitable seal glass or glass ceramic material, such as borosilicate glass. Alternatively, the seals 15 may comprise a glass ceramic material described in U.S. application Ser. No. 12/292,078 filed on Nov. 12, 2008, incorporated herein by reference.

The interconnect 9 may contain an upraised or boss region below the seal 15 if desired. If desired, the interconnect may be configured for a stack which is internally manifolded for both air and fuel. In this case, the interconnect and the corresponding fuel cell electrolyte would also contain additional air inlet and outlet openings.

Figure 4C:
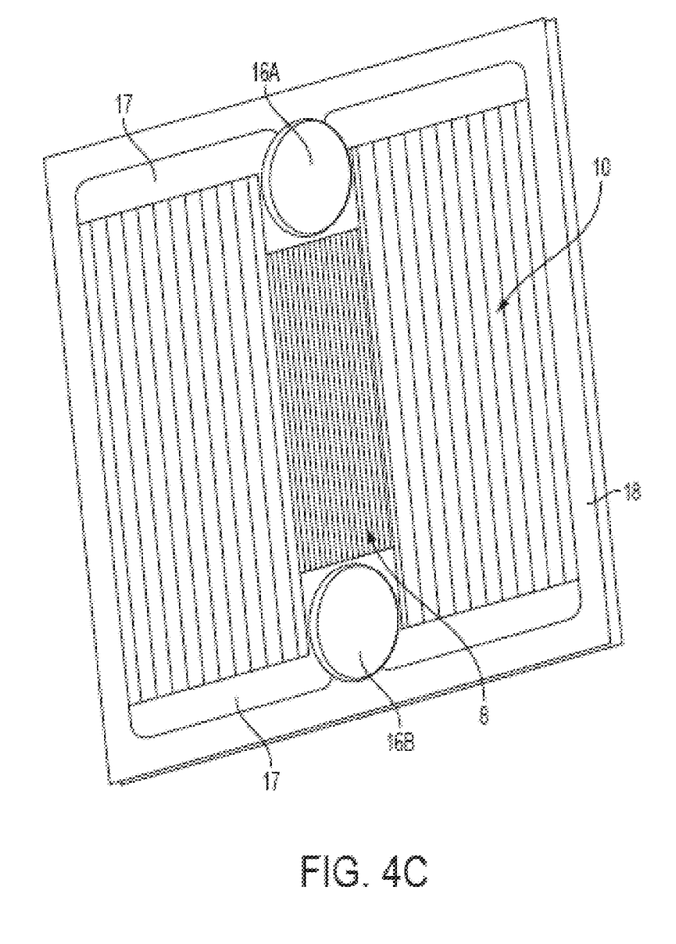
FIG. 4C is a top view of a fuel side of the interconnect.

FIG. 4C illustrates the fuel side of the interconnect 9. A window seal 18 is located on the periphery of the interconnect 9. Also shown are fuel distribution plenums 17 and fuel flow passages 8 between ribs 10. It is important to note that the interconnect shown in FIG. 4C has two types of fuel flow passages; however, this is not a limitation of the present invention. The fuel side of an interconnect may have fuel flow passages that are all the same depth and length, or a combination of short and long, and/or deep and shallow passages.

Figure 5A:
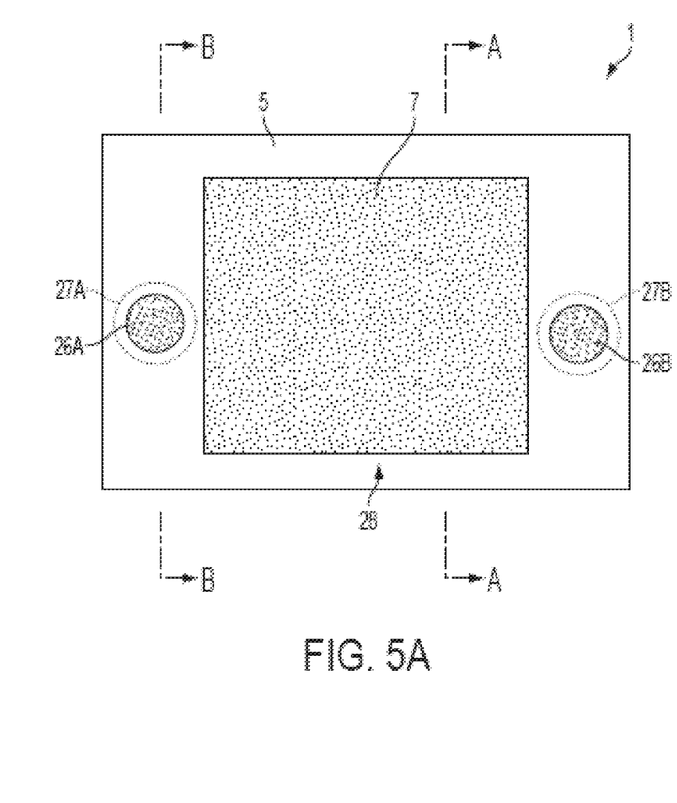
FIGS. 5A and 5B are top views of an air side of fuel cells of an embodiment of the invention.
Figure 5B:
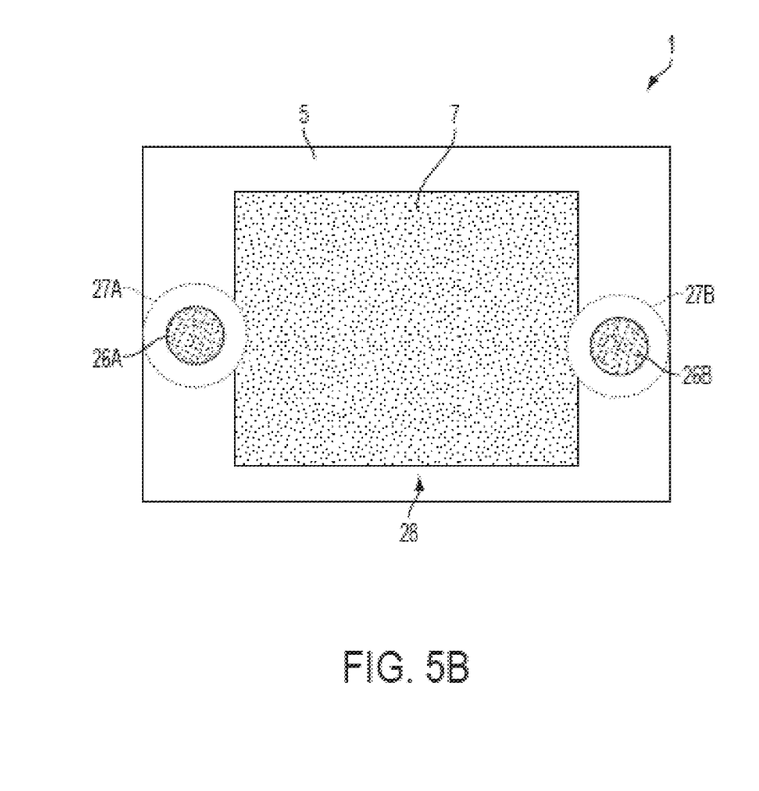

FIG. 5A illustrates a top view of one SOFC 1 of the stack 100. As shown in FIG. 5A, the SOFC 1 is positioned with the air side of the electrolyte 5 pointing up. The cathode electrode 7 is located in the middle portion of the electrolyte 5. The anode electrode 3 is located on the bottom of the electrolyte and is not shown in FIG. 5A. The electrolyte 5 contains a fuel inlet opening 26A and a fuel outlet opening 26B. The electrolyte also contains ring shaped regions 27A, 27B around the openings 26A, 26B, respectively, and a peripheral region 28. The side cross sectional view of the stack shown in FIG. 3 is taken along lines A-A in FIGS. 4A and 5A. The SOFC 1 is configured for a stack that is internally manifolded for fuel and externally manifolded for air. Alternatively, the SOFC 1 may be configured for a stack which is internally manifolded for both air and fuel. In this case, the electrolyte would contain additional air inlet and outlet openings.

Openings 26A, 26B in electrolyte 5 are lined up with the respective openings 16A, 16B in the interconnect 9 to form portions of the fuel inlet and outlet risers of the stack, as will be described in more detail with respect to FIGS. 8A-8C below. A fuel riser is a series of connected openings through the interconnect 9 and/or through one or more layers of the SOFC 1, such as the anode, cathode, and/or electrolyte through which a fuel inlet or fuel outlet streams pass through the stack 100.

Figure 6:
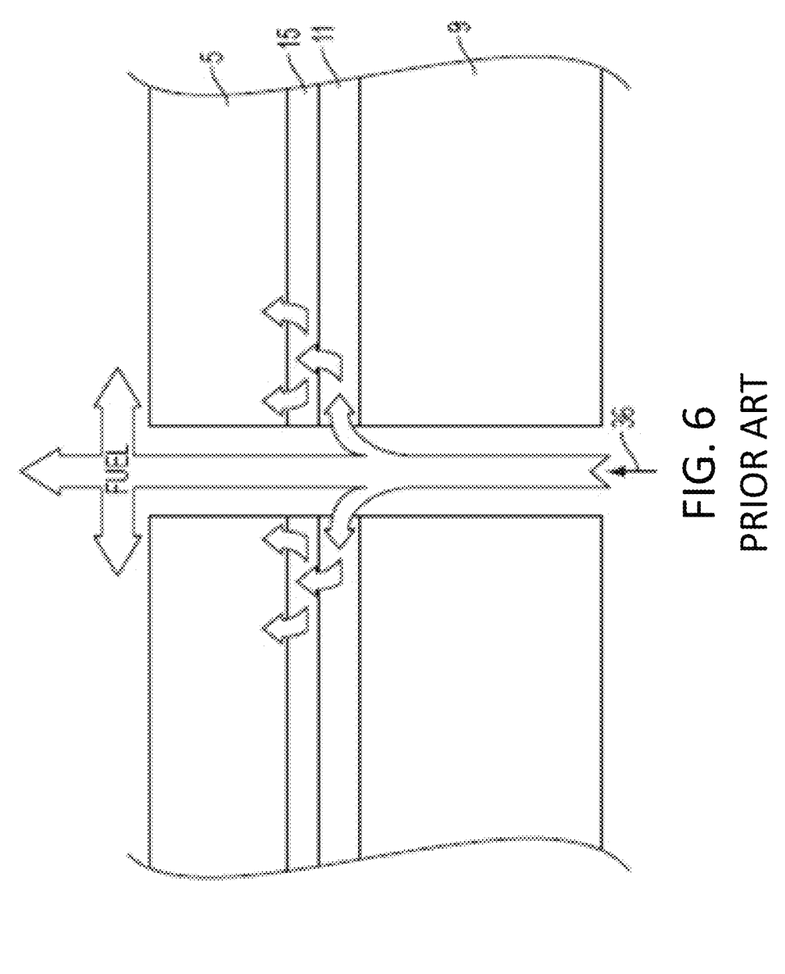
FIG. 6 illustrates a portion of a side cross sectional view of a prior art SOFC stack.
Figure 7:
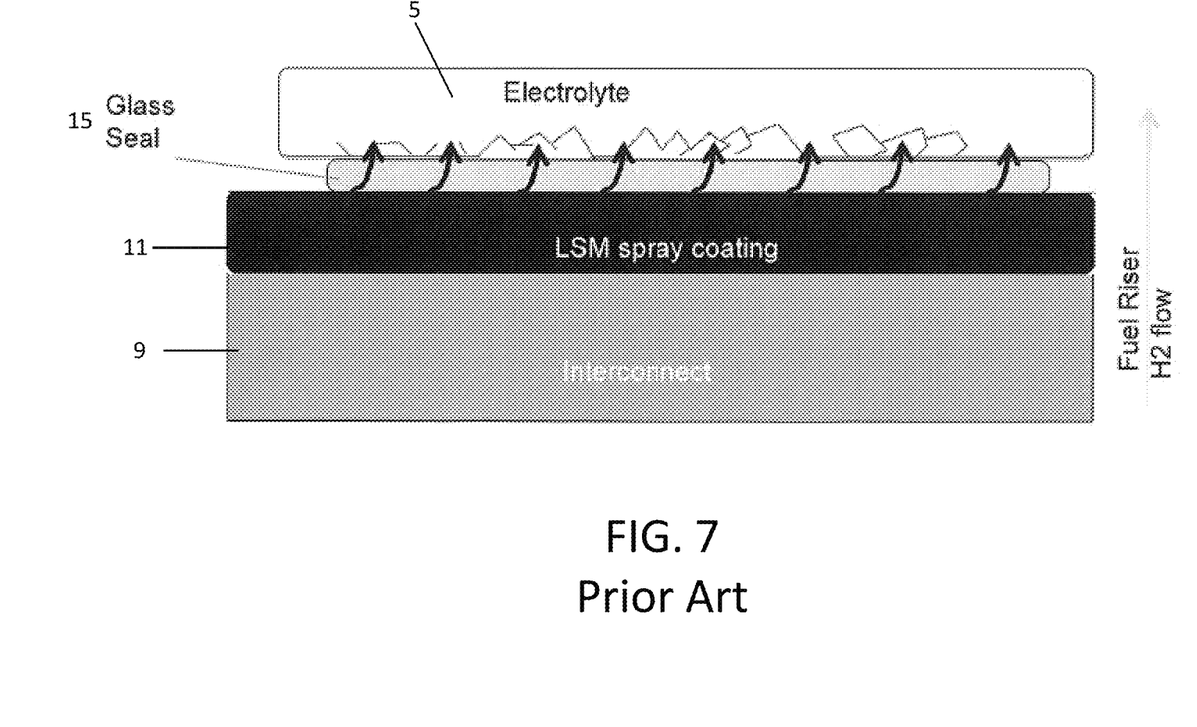
FIG. 7 is a schematic illustration of a theory of intergranular corrosion of the electrolyte of a prior art SOFC stack.

FIGS. 6 and 7 illustrate a theory of electrolyte corrosion. In the prior art SOFC stack shown in FIGS. 6 and 7, the metal oxide (e.g., LSM) layer 11 is located in contact with the ring seal 15. Without wishing to be bound by a particular theory, it is believed that manganese and/or cobalt from the manganese and/or cobalt containing metal oxide (e.g., LSM, MCO, etc.) layer 11 leaches into and/or reacts with the glass seal 15 and is then transported from the glass to the electrolyte. The manganese and/or cobalt may be transported from the glass to the electrolyte as manganese and/or cobalt atoms or ions or as a manganese and/or cobalt containing compound, such as a manganese and/or cobalt rich silicate compound. For example, it is believed that manganese and cobalt react with the glass to form a $(Si, Ba)(Mn,Co)_{6\pm\delta}$ mobile phase which is transported from the glass seal to the electrolyte. The manganese and/or cobalt (e.g., as part of the mobile phase) at or in the electrolyte 5 tends to collect at the grain boundaries of the zirconia based electrolyte. This results in intergranular corrosion and pits which weaken the electrolyte grain boundaries, ultimately leading to cracks (e.g., hole 26A to hole 26B cracks) in the electrolyte 5. Without being bound by a particular theory, it is also possible that the fuel (e.g., natural gas, hydrogen and/or carbon monoxide) passing through the fuel inlet riser 36 may also react with the metal oxide layer 11 and/or the glass seal 15 to create the mobile phase and to enhance manganese and/or cobalt leaching from layer 11 into the seal 15, as shown in FIG. 6.

The barrier(s) 12a, 12b of the embodiments of the invention reduce or prevent the interaction of the components of the LSM coating (or another Mn or Co containing metal oxide coating) with the silica based glass seals and/or prevent the interaction of manganese contaminated silica based glass seals with the electrolyte. Specifically, a barrier layer which preferably lacks any Mn and/or Co (or at least contains less than 5 at % of Mn and/or Co) prevents Mn and/or Co diffusion from the metal oxide layer into the glass seal and/or prevents the Mn and/or Co containing mobile phase diffusion from the glass seal to the electrolyte.

Figure 8A:
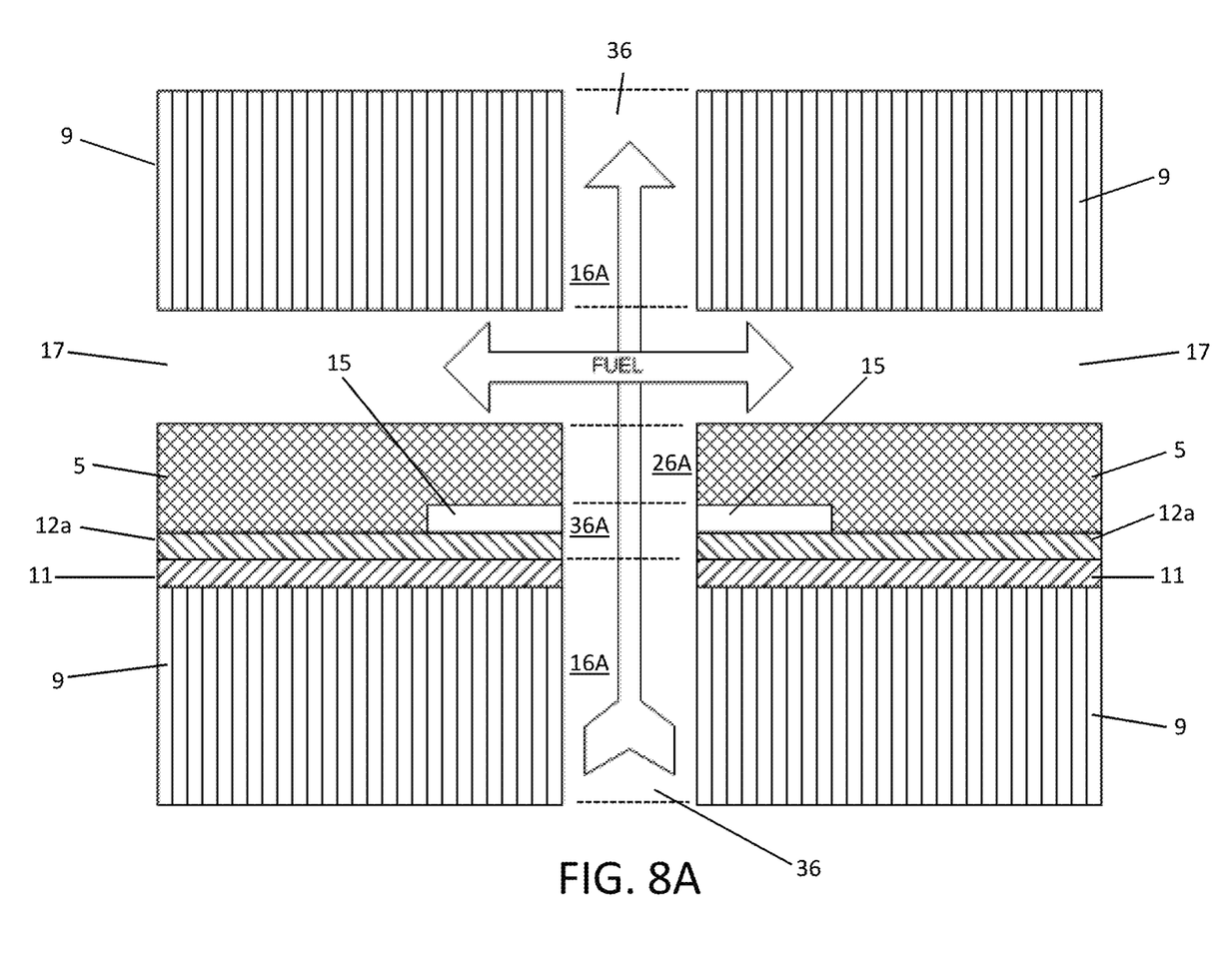
FIGS. 8A-8C illustrate a portion of a side cross sectional view of a SOFC stack along lines B-B in FIGS. 4B and 5A of embodiments of the invention.
Figure 8B:
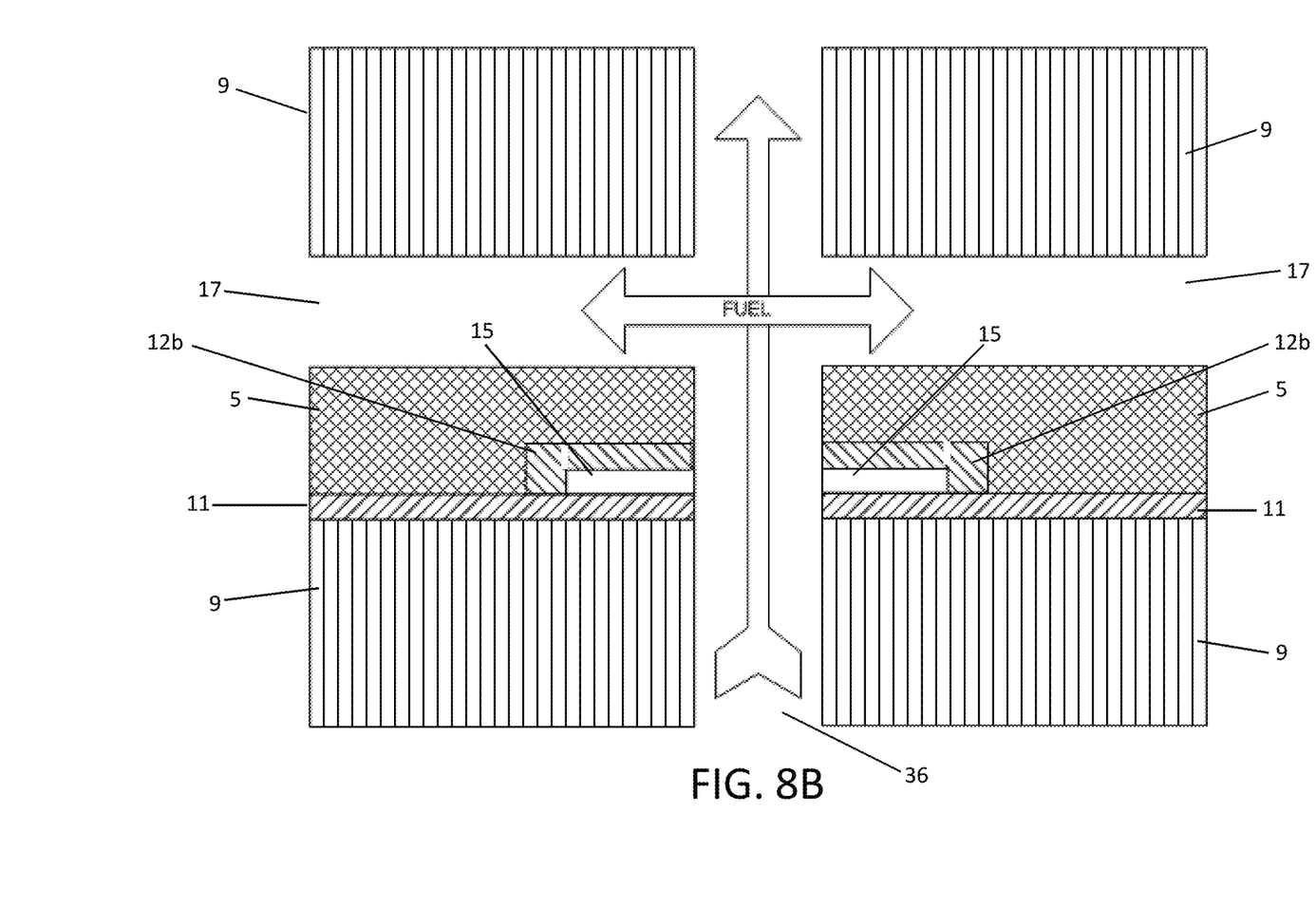
Figure 8C:
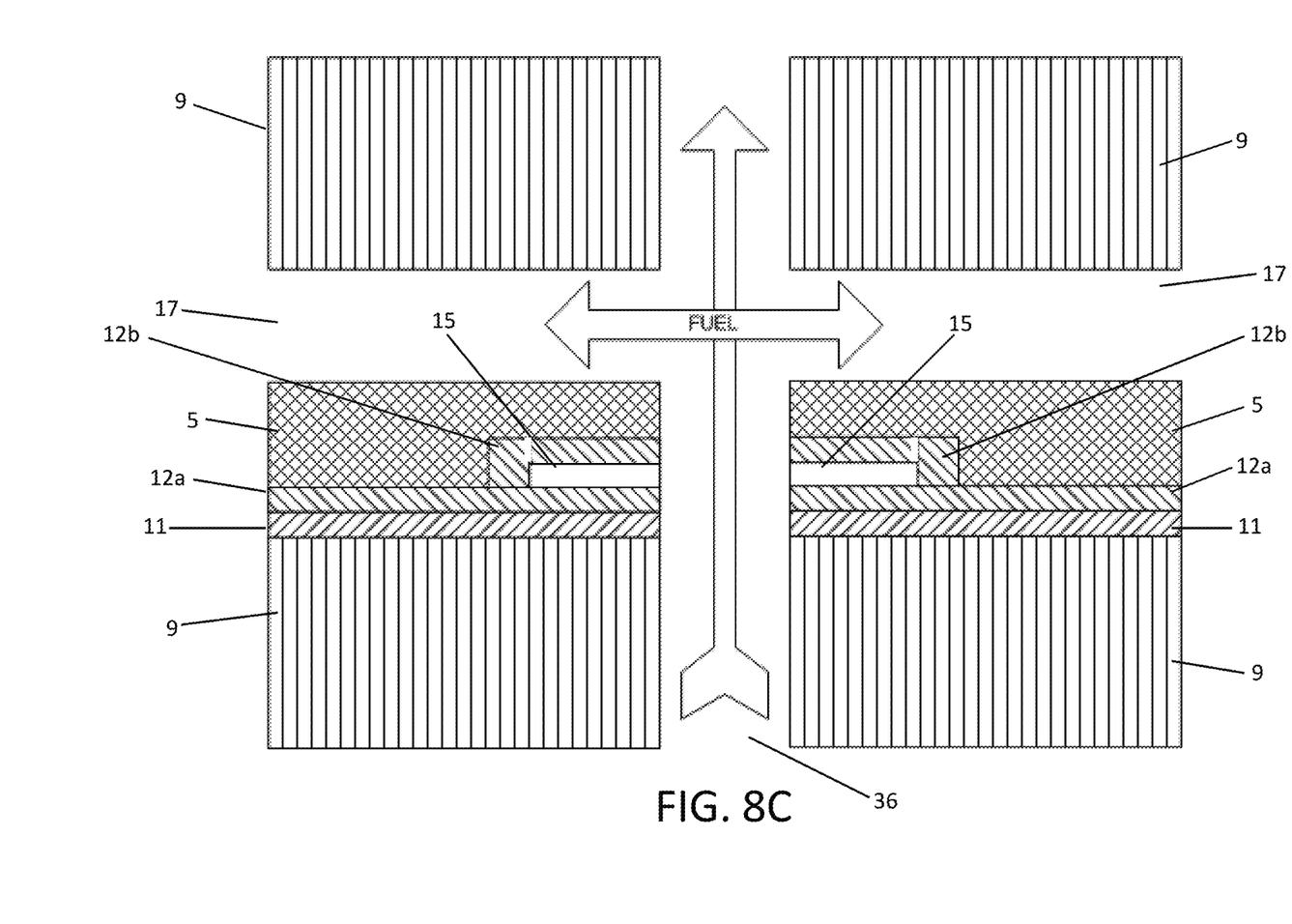

FIGS. 8A-8C illustrate a portion of a side cross sectional view along lines B-B in FIGS. 4B and 5A of the fuel inlet riser portion of the SOFC stack 100 for three different embodiments. FIGS. 8A-8C illustrate how the electrolyte 5 is protected from manganese and/or cobalt (and/or a manganese and/or cobalt containing compound, such as a manganese or cobalt rich silicate) diffusion from the electrically conductive metal oxide layer 11, such as a perovskite or spinel layer, for example an LSM and/or MCO layer on the interconnect 9, through a glass (or glass ceramic) seal 15 into the electrolyte 5. In all three embodiments, one or more manganese/cobalt diffusion barrier layers 12a, 12b are located between the electrolyte 5 and the conductive metal oxide layer 11 in the areas where the seal(s) 15 are located (e.g., in projections of areas 27A and 27B on the electrolyte). In all three embodiments, the metal oxide layer 11 is located on the air surface of the interconnect 9. The metal oxide layer directly physically contacts the cathode electrode 7 on the electrolyte 5 of the adjacent SOFC in areas of the electrolyte 5 that are not covered by the seal(s) 15. Thus, the barrier layer(s) are located around a fuel riser opening 36 between the seal 15 and at least one of the metal oxide layer 11 and the electrolyte 5 but not over the SOFC cathode electrode 7 and preferably not over the ribs 10 and flow channels 8 in the interconnect 9.

In FIG. 8A, the manganese diffusion barrier 12a is located on the metal oxide layer 11 below the ring seal 15 and the electrolyte 5. In FIG. 8B, the manganese diffusion barrier 12b is located on the ring seal 15 between the seal and the electrolyte 5. Preferably, the barrier 12b is located on both the top and side(s) of the ring seal 15 to completely separate the seal from the electrolyte. In this embodiment, manganese that diffuses into and reacts with the ring seal 15 material is prevented from reaching the electrolyte 5 by the diffusion barrier 12b. In FIG. 8C, two manganese diffusion layers 12a, 12b are provided. The first manganese diffusion barrier 12a is located on the metal oxide layer 11 below the ring seal 15 and the electrolyte 5 as provided in the embodiment illustrated in FIG. 8A. The second manganese diffusion barrier 12b is located on the top and sides of the ring seal 15 as provided in the embodiment illustrate in FIG. 8B. The first and second manganese diffusion barrier layers 12a, 12b may be made from the same or different materials. In this embodiment, the second manganese diffusion barrier 12b provides extra diffusion prevention should any manganese diffuse from the metal oxide layer 11 into the ring seal 15. While ring seals 15 are described above, it should be noted that the barrier layer(s) 12a, 12b, may be located adjacent to any other seals on the air side.

Thus, the manganese diffusion barrier layer(s) 12a and/or 12b are located between the conductive metal oxide layer 11 and the electrolyte 5. The diffusion barrier layer may be located between the conductive metal oxide layer 11 and the glass ring seal 15 (barrier layer 12a) or between the glass ring seal 15 and the electrolyte 5 (barrier layer 12b) or in both locations. Thus, even if manganese diffuses from the conductive metal oxide layer 11 into the glass ring seal 15, the manganese cannot further diffuse into the electrolyte layer 5.

FIGS. 8A-8C show one ring shaped glass (or glass ceramic) "ring" seal 15 and adjacent barriers (e.g., 12a) which is located on the air side of each interconnect 9 adjacent the fuel inlet opening 16A (i.e., a portion of the fuel inlet riser 36) extending through the interconnect 9 and metal oxide layer 11. As shown in FIG. 8A, the interior opening 36A in the seal 15 and barrier layer 12a is located over the opening 16A in the interconnect. The seal 15 also contacts an electrolyte 5 of an adjacent SOFC 1 in a region adjacent to a fuel inlet opening 26A in the electrolyte, such that the opening 26A in the electrolyte, the interior opening 36A in the seal 15 and barrier 12a, and the opening 16A in the interconnect form a portion of the fuel inlet riser 36.

A second ring seal 15 and barrier layer(s) around the fuel outlet opening 16B in the interconnect 9 are not shown for clarity. However, it should be understood that a second ring shaped glass or glass ceramic seal 15 and barrier layer(s) 12a and/or 12b are located on the air side of each interconnect 9 over the fuel outlet opening 16B in the interconnect 9 as shown in FIG. 4A. The opening 26B in the electrolyte, the interior opening in the second seal 15 and second barrier(s) and the opening 16B in the interconnect form a portion of the fuel outlet riser.

In an embodiment, the manganese diffusion barrier layer 12a comprises a glass ceramic layer formed from a substantially glass barrier precursor layer containing at least 90 wt. % glass (e.g., 90-100 wt. % glass, such as around 99 to 100 wt. % amorphous glass and 0 to 1 wt. % crystalline phase) applied to a surface of interconnect 9 in the SOFC stack. In one embodiment, the glass barrier precursor layer containing at least 90 wt. % glass comprises:

45-55 wt. % silica ($SiO_2$);
5-10 wt. % potassium oxide ($K_2O$);
2-5 wt. % calcium oxide (CaO);
2-5 wt. % barium oxide (BaO);
0-1 wt. % boron trioxide ($B_2O_3$);
15-25 wt. % alumina ($Al_2O_3$); and
20-30 wt. % zirconia ($ZrO_2$) on an oxide weight basis.

In one preferred embodiment, the glass barrier precursor layer comprises:

44.6 wt. % silica;
6.3 wt. % potassium oxide;
2.4 wt. % calcium oxide;
2.4 wt. % barium oxide;
19.1 wt. % alumina;
0.1 wt. % boron trioxide; and
25.1 wt. % zirconia on an oxide weight basis.

The use of a glass powder to make a glass barrier precursor layer followed by partially crystallizing the precursor layer to form a glass ceramic barrier layer 12a may improve properties of barrier layer 12a compared to depositing a glass ceramic barrier layer directly over the interconnect. For example, the efficacy of barrier layer 12a in preventing corrosion due to manganese and/or cobalt diffusion may be increased because of the low porosity/high density of the initial glass layer. In contrast, an as-deposited glass ceramic layer may have a higher porosity/lower density compared to a glass layer which is partially crystallized after deposition over the metal oxide contact layer 11 on the interconnect 9. Additionally, the as-deposited glass barrier precursor layer may exhibit superior adhesion to the metal oxide contact layer 11 on the interconnect 9 as compared to an as-deposited glass ceramic layer. Thus, depositing a glass barrier precursor layer (e.g., in the form of a powder or powder in a binder) followed by partially crystallizing it to form a glass ceramic barrier layer results in better barrier layer properties than directly depositing a glass ceramic layer or powder.

A method of forming a planar, electrolyte supported SOFC stack shown in FIGS. 3 and 8A-8C includes forming SOFCs 1 and interconnects 9 and alternating these SOFCs and interconnects in a stack 100.

The SOFC 1 is formed by forming the openings 26A, 26B in the electrolyte 5. Then, a cathode electrode 7 is formed on the first side of the electrolyte and an anode electrode 3 is formed on the second side of the electrolyte. The electrodes may be formed by screen printing or other suitable deposition methods. At least one of the electrolyte, cathode electrode and the anode electrode are then fired or sintered. One or more firing or sintering steps may be conducted. For example, one electrolyte firing step may be conducted after the opening 26A, 26B formation (e.g., by hole punching), another firing step after cathode deposition and a third firing step after the anode deposition. The anode and cathode deposition may be performed in either order. The three firing steps may be combined into two firing steps or into a single firing step after both electrodes are deposited.

If desired, the second barrier layer 12b shown in FIGS. 8B and 8C may be formed on the cathode 7 side of the electrolyte 5 by depositing the barrier powder (optionally with a binder) around the fuel riser openings followed by burning out the binder and sintering the powder. The barrier layer 12b may be deposited and sintered before, after, or at the same time as the cathode electrode 7.

In one embodiment, the coated interconnect 9 is formed as follows. As illustrated in FIG. 8A, the manganese diffusion barrier layer 12a may be formed on the electrically conductive contact layer 11, such as a metal oxide layer (e.g., LSM and/or MCO layer) which is deposited on the air surface of interconnect 9.

In one non-limiting example, the manganese diffusion barrier layer 12a may be formed as follows. Starting material powders, such as alkali or alkali earth carbonates (e.g., potassium carbonate, calcium carbonate, and/or barium carbonate) and/or metal or metalloid oxides (e.g., aluminum oxide, boron oxide, silica, and/or zirconia) are combined in a powder mixture. The powder mixture is then melted at a temperature of at least 1400° C. (e.g., 1500-1550° C.) to form a precursor melt. The melt is then quickly cooled (e.g., quenched) to form a glass body that is at least 90 wt. % glass (e.g., 90 to 100 wt. % glass, such as 99-100% glass).

The glass body is then crushed into a glass powder. The glass powder (or glass powder in a binder) is then applied over interconnect 9. For example, the glass powder may be applied on the metal oxide layer 11 located on the air side of the interconnect 9 in the fuel riser regions adjacent to a fuel inlet and/or fuel outlet opening 16A, 16B (e.g., the fuel riser opening). The applied glass powder forms a glass barrier precursor layer over regions on which the ring seal will be provided. Thus, the first barrier layer 12a shown in FIGS. 8A and 8B may be deposited on the interconnect as a glass powder barrier precursor layer containing an optional binder around the fuel riser openings 16A, 16B, followed by burning out the binder (if present).

Optionally, the glass powder of the barrier precursor layer may be sintered or densified before the seals 15 are formed on the barrier precursor layer and before the interconnect is placed into the stack. Alternatively, the barrier precursor layer may be sintered together with the seals after the interconnect 9 is provided into the stack 100.

The ring seal(s) 15 are then formed on the surface of the manganese diffusion barrier precursor layer. The glass or glass ceramic ring seal 15 may be applied over the glass barrier precursor layer in regions adjacent to a fuel inlet 16A and/or fuel outlet 16B opening in the interconnect 9.

The interconnect 9 is then placed into a SOFC stack 100 containing the fuel cells 1 and other interconnects 9. In regions of the metal oxide layer 11 that are not covered by the ring seal 15 (not shown), the glass barrier precursor layer may directly contact the cathode electrode 7 on the electrolyte 5 of an adjacent SOFC 1 in the stack 100.

The SOFC stack is then sintered (i.e., heated at a temperature of at least 900° C., such as 900-950° C.) for 1-10 hours (e.g., 2-5 hours) to melt and set the ring seal(s) 15 and to convert the glass barrier precursor layer(s) to glass ceramic barrier layer(s) 12a.

During the sintering, the glass barrier precursor layers in the stack are partially crystallized to form glass ceramic manganese/cobalt barrier layers 12a containing crystalline phases distributed in a glassy (e.g., amorphous) matrix phase. Without wishing to be bound by a particular theory, it is believed that zirconium silicate ($ZrSiO_4$) crystals (i.e., crystalline phase), which provide the corrosion resistance and manganese/cobalt barrier properties, may precipitate (e.g., nucleate and grow) in the glassy matrix. Other "filler" crystals (i.e., crystalline phases) that allow stack sintering at relatively low temperatures (e.g., below 1000° C.) may also precipitate in the glassy matrix, such as barium aluminum silicate ($BaAl_2Si_2O_8$) and potassium feldspar ($KAlSi_3O_8$) crystals. All of these materials may crystallize at different temperatures from one another. For example, when the sintering temperature reaches about 820° C., barium aluminum silicate crystals may precipitate first, followed by zirconium silicate crystals, and then by potassium feldspar crystals. The resulting glass ceramic layer (i.e., zirconium silicate crystals and filler crystals in the remaining glassy matrix) form the manganese/cobalt diffusion barrier layer 12a. The SOFC stack operates in temperatures ranging from 750 to 1,000° C. It is believed that after around 2000 hours of operation of the SOFC stack, further filler crystals, such as alumina crystals, may form (e.g., nucleate and grow) in the barrier layer 12a.

The manganese/cobalt diffusion barrier layer 12a composition depends on the composition of the glass powder that becomes the glass barrier precursor layer on interconnect 9. In an embodiment, the glass powder in the glass barrier precursor layer may have a composition of $SiO_2$-$(M1)_2O$-$(M2)O$-$(M3)_2O_3$-$(M4)O_2$. M1 may comprise an alkali metal, such as at least 80 wt. % potassium, such as 80-100% potassium. M2 may comprise an alkali earth metal, such as at least 80 wt. % barium and/or calcium, such as 80-100 wt. % barium and calcium (e.g., 2:1 to 1:2, such as 1:1 weight ratio of Ba to Ca). M3 may comprise a Group 13 (i.e., Group IIIA) element of the Periodic Table of Elements, such as at least 80 wt. % boron and aluminum, such as 90-100 wt. % Al and 0-10 wt. % boron. M4 may comprise a transition metal, such as at least 80 wt. % zirconium, such as 80-100 wt. % zirconium. For example, the glass barrier precursor layer composition may include silica, potassium oxide ($K_2O$), barium oxide (BaO), calcium oxide (CaO), alumina, zirconia, and optionally boron trioxide ($B_2O_3$).

In particular, the range of silica content may be 45-55 wt. % in the glass powder. If there is less than 45 wt. % silica, then there may be too little silica to form a substantially glass body by quenching the precursor melt. In other words, an undesirable amount of crystals may be present in the glass body quenched from the precursor melt. If there is greater than 55 wt. % silica, then there may be too much silica based glassy matrix phase and insufficient amount of the zirconium silicate crystals in the barrier layer 12a, which may degrade the barrier corrosion prevention properties.

The range of $K_2O$ content may be 5-10 wt. % in the glass powder. If there is less than 5 wt. % $K_2O$, then there may too little potassium to create a sufficient amount of potassium feldspar crystals. If there is more than 10 wt. % $K_2O$, then the resulting barrier layer 12a composition may contain too much of the glassy matrix phase after sintering.

The range of CaO and BaO content may each be 2-5 wt. % in the glass powder (e.g., 4-10 wt. % alkali earth oxide). If there is less than 2 wt. % of CaO and of BaO, then there may be insufficient calcium to create a sufficient amount of potassium feldspar crystals and insufficient barium to create a sufficient amount of barium aluminum silicate crystals, respectively. However, if there is more than 5 wt. % of either CaO or BaO (i.e., more than 10 wt. % of alkali earth oxide), then the coefficient of thermal expansion (CTE) of the barrier layer 12a may become too different from the CTE of the interconnect 9 (e.g., a chromium (Cr) and 4 to 6 wt. % iron (Fe) alloy interconnect) and cause an undesirable CTE mismatch between the interconnect and the barrier layer.

The range of zirconia content may be 20-30 wt. % in the glass powder. If there is less than 20 wt. % zirconia, then there may be insufficient zirconium to make a sufficient amount of the corrosion-resistant $ZrSiO_4$ crystals. If there is more than 30 wt. % zirconia, then the precursor powder composition becomes difficult to melt completely into the precursor melt at a reasonable temperature (e.g., 1550° C. or below) and it becomes difficult to form the glass body from the melt without including zirconia or zirconium silicate crystals.

The range of boron trioxide content may be 0-1 wt. % in the glass powder. Preferably, as little as possible of boron trioxide is used, since it negatively affects the barrier layer 12. Thus, it may be omitted entirely. However, boron trioxide is a sintering aid and may be used in a small amount of 1 wt. % or less to enhance melting and sintering at a reasonable temperature.

The range of alumina content may be 15-25 wt. % in the glass powder. Alumina is a balancing component which provides the balance of aluminum needed (without excess) to form barium aluminum silicate crystals and potassium feldspar crystals. Thus, the 15-25 wt. % range provides a sufficient amount of aluminum to form these crystals.

The foregoing description of the invention has been presented for purposes of illustration and description. It is not intended to be exhaustive or to limit the invention to the precise form disclosed, and modifications and variations are possible in light of the above teachings or may be acquired from practice of the invention. The description was chosen in order to explain the principles of the invention and its practical application. It is intended that the scope of the invention be defined by the claims appended hereto, and their equivalents.

What is claimed is:

1. An interconnect for a fuel cell stack, comprising
an interconnect body having an air surface having air flow channels and ribs and a fuel surface having fuel flow channels and ribs;
an electrically conductive contact layer located on the air surface of the interconnect, the electrically conductive contact layer containing at least one of Co and Mn; and
a first layer located over the electrically conductive contact layer, the first layer comprising:
at least 45 wt. % silica ($SiO_2$);
at least 5 wt. % potassium oxide ($K_2O$);
at least 2 wt. % calcium oxide (CaO);
5 wt. % or less barium oxide (BaO);
greater than zero wt. % boron trioxide ($B_2O_3$);
25 wt. % or less alumina ($Al_2O_3$); and
30 wt. % or less zirconia ($ZrO_2$) on an oxide weight basis.

2. The interconnect of claim 1, wherein the first layer comprises a glass barrier precursor layer.

3. The interconnect of claim 1, wherein the first layer comprises a glass ceramic barrier layer.

4. The interconnect of claim 3, further comprising a glass or glass ceramic seal located over the first layer.

5. The interconnect of claim 4, wherein:
the glass ceramic barrier layer comprises zirconium silicate ($ZrSiO_4$) crystals, barium aluminum silicate ($BaAlSiO_4$) crystals and potassium feldspar ($KAlSi_3O_8$) crystals located in a glassy matrix;

the seal comprises a ring seal located over the glass ceramic barrier layer in at least one fuel riser region around a fuel riser opening through the interconnect;

the electrically conductive contact layer comprises lanthanum strontium manganite (LSM), manganese cobalt oxide spinel (MCO) or a mixture thereof;

the interconnect comprises a chromium-iron alloy interconnect; and the glass ceramic barrier layer prevents or reduces at least one of Mn and Co diffusion from the electrically conductive contact layer to the seal.

* * * * *